(12) United States Patent
Tan et al.

(10) Patent No.: US 8,471,703 B2
(45) Date of Patent: Jun. 25, 2013

(54) NETWORK STATUS INDICATION SYSTEM AND METHOD THEREOF

(75) Inventors: Jie-Jun Tan, Shenzhen (CN); Hua Dong, Shenzhen (CN); Yu-Long Lin, Shenzhen (CN); Yi-Yong Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 329 days.

(21) Appl. No.: 13/048,950

(22) Filed: Mar. 16, 2011

(65) Prior Publication Data
US 2012/0161966 A1 Jun. 28, 2012

(30) Foreign Application Priority Data
Dec. 28, 2010 (CN) .......................... 2010 1 0609207

(51) Int. Cl.
*G08B 21/00* (2006.01)

(52) U.S. Cl.
USPC ...................... 340/540; 340/691.1; 340/691.6

(58) Field of Classification Search
USPC ................. 340/540, 691.1, 691.6, 691.8, 3.1, 340/3.3, 286.02, 815.4; 345/168, 172
See application file for complete search history.

(56) References Cited

U.S. PATENT DOCUMENTS

| 5,437,009 | A | * | 7/1995 | Lane | 345/636 |
| 7,372,371 | B2 | * | 5/2008 | Bear et al. | 340/815.4 |
| 2011/0260864 | A1 | * | 10/2011 | Dearborn et al. | 340/540 |

* cited by examiner

*Primary Examiner* — Toan N Pham
(74) *Attorney, Agent, or Firm* — Altis Law Group, Inc.

(57) ABSTRACT

A network status indication system utilizes indicators on a keyboard to indicate the network status of a computer. When a simultaneous activation of two predetermined keys is detected and when the number of simultaneous activations is odd, the network status is determined, thereby indicating the network status of the computer.

6 Claims, 3 Drawing Sheets

NETWORK STATUS INDICATION SYSTEM AND METHOD THEREOF

BACKGROUND

1. Technical Field

The present disclosure relates to a network status indication system and method thereof.

2. Description of Related Art

Most computer network cards have at least two indicators. One of the indicators is a signal indicator to indicate network connection status and the connection between network components. The signal indicator is kept on when a computer is correctly connected to network. The other of the indicators indicates the transmission and the reception of network data packets by flickering. Consequently, the network status of computer can be observed through the indicators. However, the indicators of most computer network cards are disposed behind the host computer, and is inconvenient to observe.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
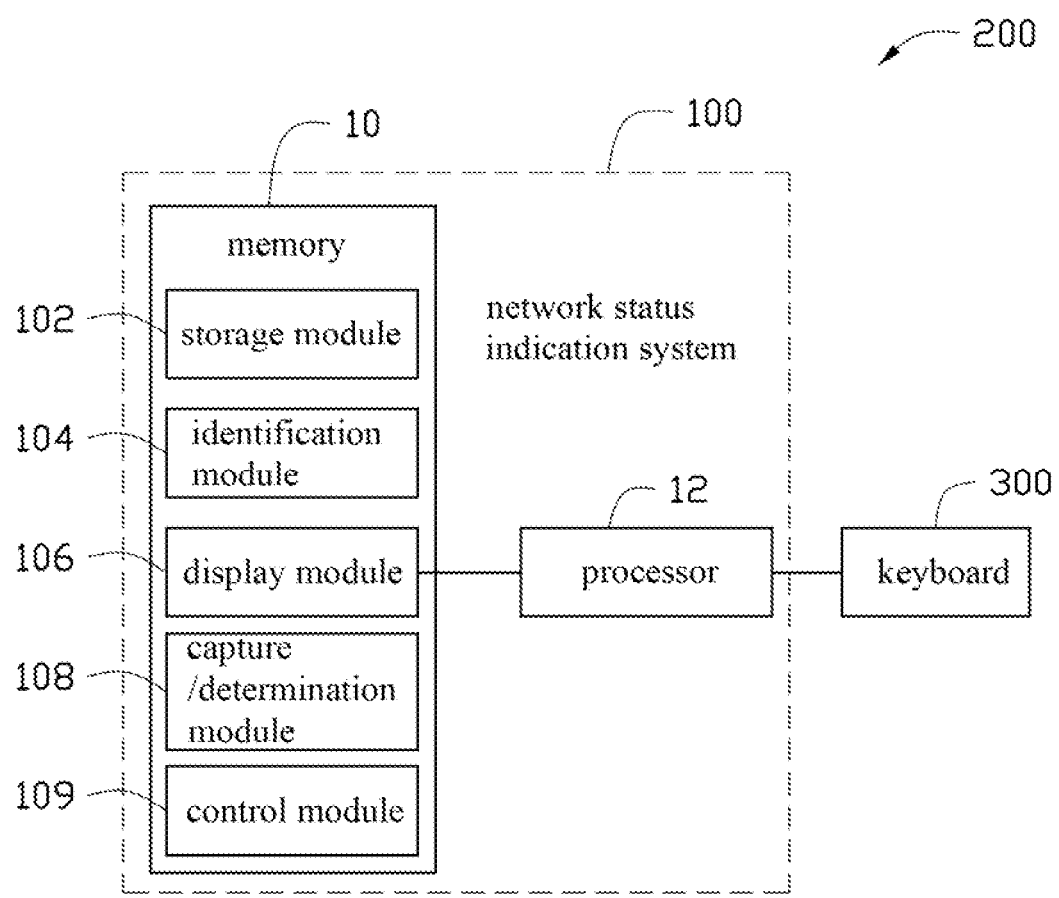
FIG. 1 is a block diagram of a preferred embodiment of a network status indication system of the present disclosure.

As shown in FIG. 1, a network status indication system 100 of the present disclosure utilizes the indicators of a keyboard 300 of a computer 200 to indicate the network status of the computer 200. A preferred embodiment of the network status indication system 100 includes a memory 10 and a processor 12. The processor 12 executes the instructions of the modules in the memory 10. In this embodiment, two indicators of the keyboard 300 are utilized.

The memory 10 includes a storage module 102, an identification module 104, a display module 106, a capture/determination module 108, and a control module 109.

After the computer 200 is turned on, the identification module 104 determines whether two predetermined keys such as Num Lock key and Scroll Lock key of the keyboard 300 are simultaneously activated. When simultaneous activation of the predetermined keys is detected, the identification module 104 outputs a storage instruction to the storage module 102.

After receiving the storage instruction, the storage module 102 stores the on/off statuses of Num Lock indicator and Scroll Lock indicator of the keyboard 300 and the number of the simultaneous activations of these predetermined keys, and outputs a determination instruction to the capture/determination module 108. The initial value of the number of the simultaneous activation stored in the storage module 102 is 0 and increased by 1 before each storage. The on/off status of the indicators is stored through replacing the existing on/off status in the storage module 102.

After receiving the determination instruction, the capture/determination module 108 retrieves the number of the simultaneous activation of the predetermined keys from the storage module 102, and determines whether the number is odd. If the number is odd, the capture/determination module 108 outputs an emulation instruction to the control module 109, and if even, the capture/determination module 108 outputs a prompt instruction to the display module 106.

After receiving the emulation instruction, the control module 109 obtains the network status of the computer 200 from a network card of the computer 200, emulating key instructions of the indicators of the keyboard 300 corresponding to the predetermined keys to enable the indicators to operate corresponding to the network status of the computer 200 (that is, corresponding to the operation of the network status indicators of the computer 200). The control module 109 further outputs a display instruction to the display module 106.

The display module 106 enables the computer 200 to display an interface after receiving the display instruction to notify the user that the indicators of the keyboard 300 are in a network indication status and requesting whether either of the predetermined keys can be activated to quit the network indication status. The display module 106 further enables the computer 200 to display an interface after receiving the prompt instruction for requesting whether network indication status can be entered by simultaneously activating the predetermined key again, and can quit by activating either of the predetermined keys.

After detecting the activation of either of the predetermined keys, the capture/determination module 108 retrieves the on/off status of the indicators from the storage module 102, and outputs the on/off status of the indicators to the control module 109.

After receiving the on/off status of the indicators, the control module 109 emulates corresponding key instructions to restore the on/off status of the indicators of the keyboard 300 to a condition identical to that stored in the storage module 102, thereby quitting the network indication status.

Figure 2A:
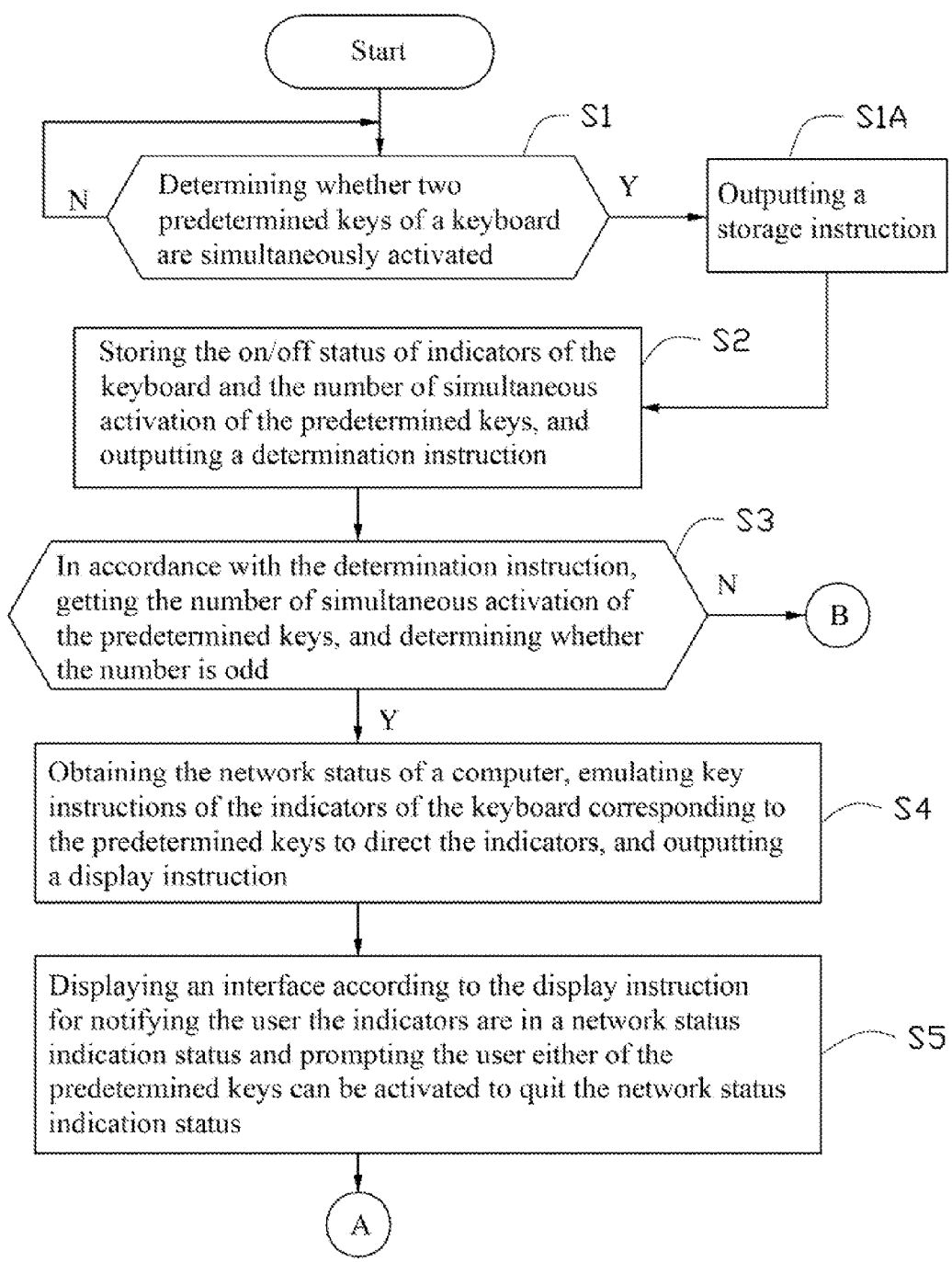
FIG. 2A/2B is a flowchart of a preferred embodiment of a network status indication method of the present disclosure.
Figure 2B:
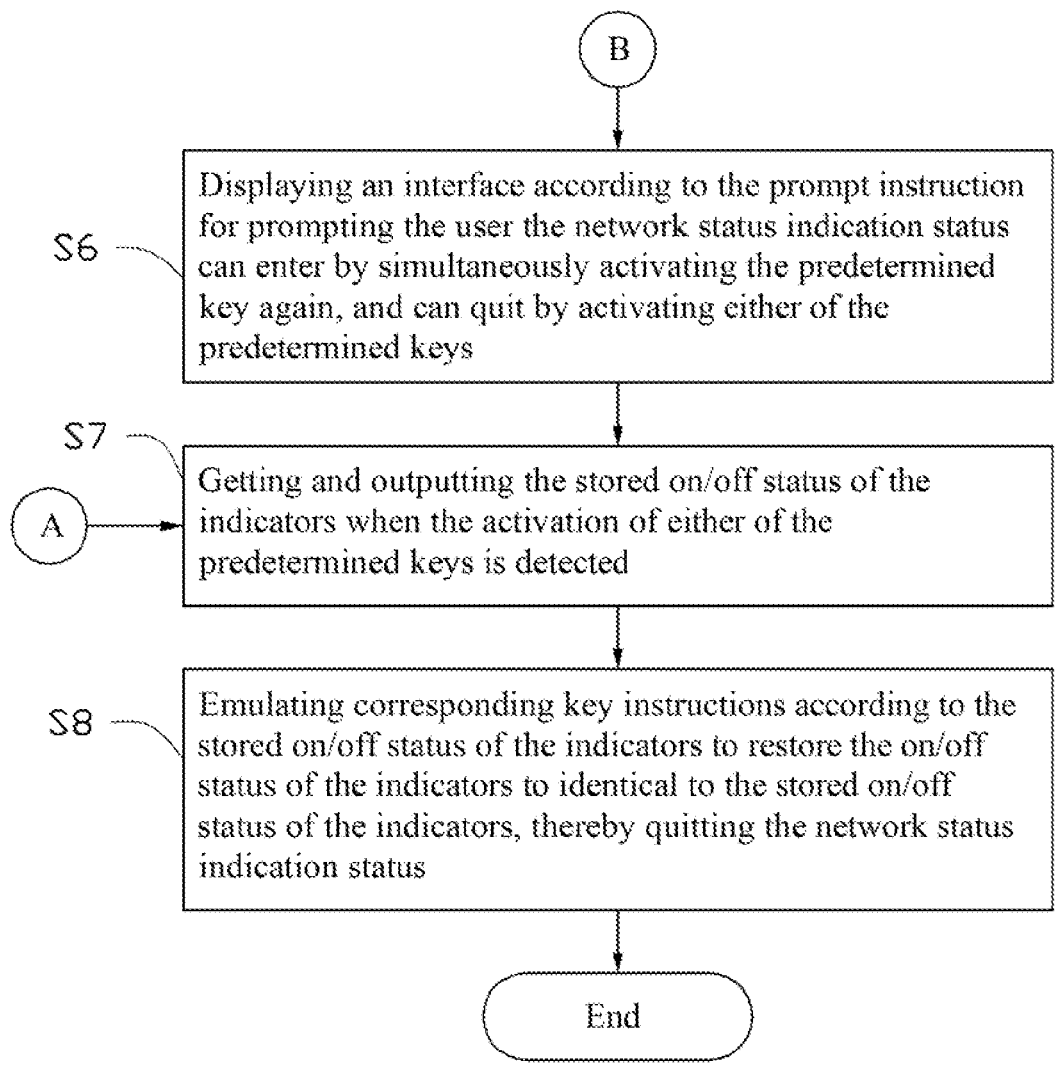

As shown in FIG. 2A/2B, a network status indication method of the present disclosure utilizes the indicators of a keyboard 300 of a computer 200 to indicate the network status of the computer 200. A preferred embodiment of the network status indication method is as follows. Depending on the embodiment, additional steps may be added, others removed, and the ordering of the steps may be changed.

In step S1, after the computer 200 is turned on, the identification module 104 determines whether two predetermined keys of the keyboard 300 are simultaneously activated. When a simultaneous activation of the predetermined keys is detected, step S1A is implemented; otherwise, step S1 is repeated.

In step S1A, a storage instruction is output to the storage module 102.

In step S2, after receiving the storage instruction, the storage module 102 stores the on/off status of the indicators corresponding to the predetermined keys and the number of the simultaneous activation of the predetermined keys, and outputs a determination instruction to the capture/determination module 108.

In step S3, after receiving the determination instruction, the capture/determination module 108 retrieves the number of the simultaneous activations of the predetermined keys from the storage module 102, and determines whether the number is odd. If the number is odd, the capture/determination module 108 outputs an emulation instruction to the control module 109, and step S4 is implemented, and if the number is even, the capture/determination module 108 outputs a prompt instruction to the display module 106, and step S6 is implemented.

In step S4, the control module 109 obtains the network status of the computer 200 from a network card of the computer 200, emulating key instructions of the indicators of the keyboard 300 corresponding to the predetermined keys to enable the indicators of the keyboard 300 to operate corresponding to the network status of the computer (that is, corresponding to the operation of the network status indicators of the computer 200). The control module 109 further outputs a display instruction to the display module 106.

In step S5, after receiving the display instruction, the display module 106 enables the computer 200 to display an interface to notify the user that the indicators are in a network indication status and requesting whether either of the predetermined keys can be activated to quit the network indication status. Step S7 is implemented.

In step S6, the display module 106 enables the computer 200 to display an interface after receiving the prompt instruction requesting whether the network indication status can be entered by simultaneously activating the predetermined key again, and can quit by activating either of the predetermined keys. Step S7 is implemented.

In step S7, after detecting the activation of either of the predetermined keys, the capture/determination module 108 retrieves the on/off status of the indicators from the storage module 102, and outputs the on/off status of the indicators to the control module 109.

In step S8, the control module 109 emulates corresponding key instructions to restore the on/off status of the indicators to a condition identical to that stored in the storage module 102 after receiving the on/off status of the indicators, thereby quitting the status indicating network status.

The network status indication system 100 indicates the network status of the computer 200 through the indicators of the keyboard 300 corresponding to the predetermined keys when a simultaneous activation of two predetermined keys is detected. Consequently, the network status of the computer 200 is easily perceived.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A network status indication system utilizing indicators on a keyboard of a computer to indicate the network status of the computer, comprising:
   a memory, comprising:
      an identification module, wherein after the computer is turned on, the identification module determines whether two predetermined keys of the keyboard are simultaneously activated, and outputs a storage instruction after a simultaneous activation of the predetermined keys is detected;
      a storage module, wherein after receiving the storage instruction, the storage module stores the on/off status of the indicators corresponding to the predetermined keys and the number of the simultaneous activation of the predetermined keys, and outputs a determination instruction;
      a capture/determination module, wherein after receiving the determination instruction, the capture/determination module retrieves the number of the simultaneous activation of the predetermined keys from the storage module, determines whether the number is odd, and outputs an emulation instruction when the number is odd; and
   a control module, wherein after receiving the emulation instruction, the control module obtains the network status of the computer, emulating key instructions of the indicators of the keyboard corresponding to the predetermined keys to enable the indicators to operate corresponding to the network status of the computer, and outputs a display instruction;
   wherein the capture/determination module further retrieves the on/off status of the indicators from the storage module and outputs the on/off status of the indicators after detecting the activation of either of the predetermined keys, the control module further emulates corresponding key instructions to restore the on/off status of the indicators to a condition identical to the on/off status of the indicators stored in the storage module.

2. The network status indication system of claim 1, wherein the network status indication system further includes a display module enabling the computer to display an interface after receiving the display instruction for notifying a user the indicators are in a network indication status and requesting whether either of the predetermined keys can be activated to quit the network indication status.

3. The network status indication system of claim 1, wherein the capture/determination module further outputting a prompt instruction to the display module when the number of the simultaneous activation of the predetermined keys is even, the display module further requesting whether the network indication status can be entered by simultaneously activating the predetermined key again, and can quit by activating either of the predetermined keys.

4. A network status indication method utilizing indicators on a keyboard of a computer to indicate the network status of the computer, the network status indication method comprising:
   a) determining whether two predetermined keys of a keyboard are simultaneously activated, and outputting a storage instruction when a simultaneous activation of the predetermined keys is detected;
   b) in accordance with the storage instruction, storing the on/off status of the indicators corresponding to the predetermined keys and the number of the simultaneous activation of the predetermined keys, and outputting a determination instruction;
   c) in accordance with the determination instruction, retrieving the number of the simultaneous activation of the predetermined keys, and determining whether the number is odd, outputting an emulation instruction when the number is odd;
   d) in accordance with the emulation instruction, obtaining the network status of a computer, emulating key instructions of the indicators of the keyboard corresponding to the predetermined keys to enable the indicators to operate corresponding to the network status of the computer, and outputting a display instruction;
   e) retrieving and outputting the stored on/off status of the indicators when the activation of either of the predetermined keys is detected; and
   f) emulating corresponding key instructions according to the stored on/off status of the indicators to restore the on/off status of the indicators to a condition identical to the stored on/off status of the indicators.

5. The network status indication method of claim 4, wherein step c further comprises:

when the number is even, outputting a prompt instruction; and enabling the computer to display an interface according to the prompt instruction for requesting whether the network indication status can be entered by simultaneously activating the predetermined key again, and can quit by activating either of the predetermined keys.

6. The network status indication method of claim 4, wherein step d further comprises:

outputting a display instruction after enabling the indicators to operate corresponding to the network status of the computer, and enabling the computer to display an interface according to the display instruction for notifying a user the indicators are in a network indication status and requesting whether either of the predetermined keys can be activated to quit the network indication status, then return to step e.

\* \* \* \* \*